Figure 1:
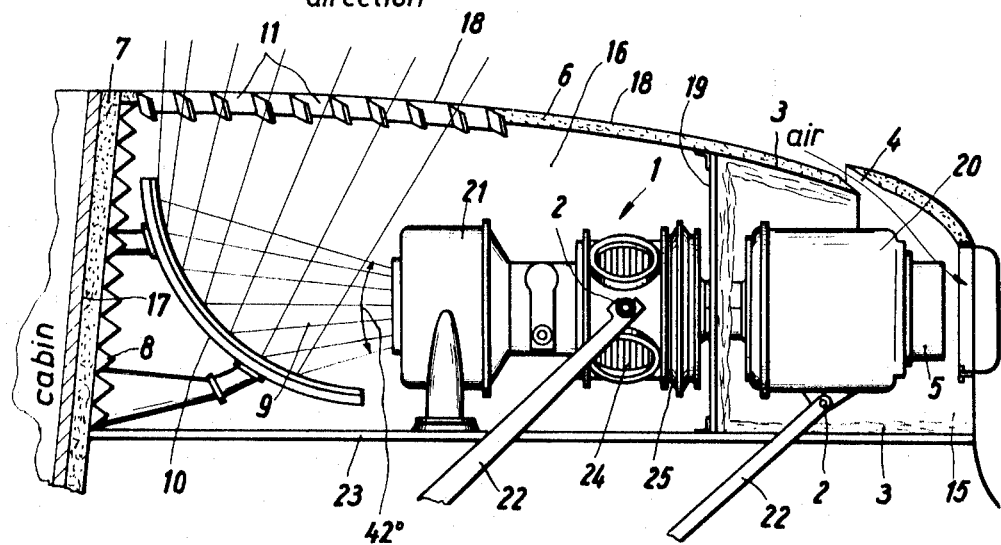

United States Patent

[11] 3,620,487

| [72] | Inventor | Christoph Fischer<br>Bremen-Huchting, Germany |
|---|---|---|
| [21] | Appl. No. | 861,305 |
| [22] | Filed | Sept. 26, 1969 |
| [45] | Patented | Nov. 16, 1971 |
| [73] | Assignee | Vereinigte Flugtechnische Werke<br>Gesellschaft mit beschrankter Haftung<br>fruher "Weser" Flugzeubau/Focke-<br>Wulf/Heinkel-Flugzeubau<br>Bremen, Germany |
| [32] | Priority | Oct. 3, 1968 |
| [33] | | Germany |
| [31] | | P 18 00 933.1 |

[54] DEVICE FOR REDUCING THE SOUND OF THE TURBINE PLANT IN AIRPLANES
14 Claims, 2 Drawing Figs.

[52] U.S. Cl. .................................................. 244/55,
244/17.11
[51] Int. Cl. ..................................................... B64d 1/27
[50] Field of Search .......................................... 244/53,
17.11, 17.19, 54.55; 60/39.16; 181/33.05, 33.15,
33.22, 33.223, 33.4

[56] References Cited
UNITED STATES PATENTS
2,294,399  9/1942  Fukal ........................... 181/33.22

| 2,648,192 | 8/1953 | Lee .................................. | 181/33.22 |
| 3,103,987 | 9/1963 | Gildard et al. ................... | 181/33.22 |
| 3,163,353 | 12/1964 | Petrie .............................. | 60/39.16 |
| 3,351,304 | 11/1967 | Stein et al. ...................... | 244/17.19 |

FOREIGN PATENTS

| 1,186,310 | 1959 | France ........................... | 181/33.05 |
| 595,143 | 1959 | Italy ............................... | 181/33.15 |
| 138,709 | 1953 | Sweden .......................... | 181/33.05 |

*Primary Examiner*—Milton Buchler
*Assistant Examiner*—Steven W. Weinrieb
*Attorney*—Walter Becker ABSTRACT: An arrangement for reducing the transmission of sound from the drive plant of an air vehicle to the cabin thereof, according to which the drive plant compartment is subdivided into a first section with the compressors and a second section with the turbine means and the exhaust gas outlet, and in which the primarily low-frequency sound created in said second section is directed in a direction away from the air vehicle cabin, whereas the primarily high-frequency sound created in said first section is directed in forward flight direction of the air vehicle and is deviated by a sound deflector and discharged outwardly away from the cabin.

PATENTED NOV 16 1971 3,620,487 forward flight direction

Inventor:
Christoph Fischer
By
Walter Becky

DEVICE FOR REDUCING THE SOUND OF THE TURBINE PLANT IN AIRPLANES

The present invention concerns a device for reducing the sound of the turbine plant in air vehicles.

The development of turbine plants of high output for air vehicles requires a sufficient muffling of the sound energy produced by the turbine plant.

It is, therefore, an object of the present invention to reduce the sound intensity produced by the turbine plant in the passenger compartment of an air vehicle.

Figure 2:
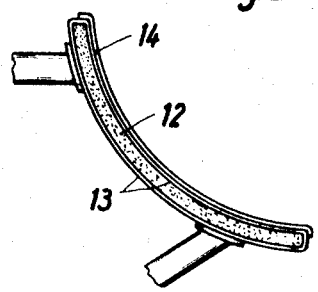

This object and other objects and advantages of the invention will appear more clearly from the following specification in connection with the accompanying drawing, in which:

FIG. 1 illustrates partly in section an arrangement of a turbine plant in the corresponding chamber of a helicopter in conformity with the present invention. FIG. 2 is a section through a sound reflector according to the invention. The device according to the present invention for reducing the noise of the turbine plant of an air vehicle, especially helicopter, is characterized primarily in that the driving plant, the work compressor, gas generator compressor, gas generator turbine, cantilever shaft turbine and exhaust gas outlet of which are coaxially arranged in the above mentioned sequence in such a way that the work compressor is located in front when viewing in flight direction and the exhaust gas outlet is located in the rear, is arranged behind the cabin in such a way that the primarily high-frequency and strongly bundled sound of the compressors is radiated or emanated toward the front whereas the primarily low-frequency sound which is produced by the intermixing of the exhaust gas jet with the surrounding air is radiated primarily in a direction away from the cabin.

This brings about the advantage that two sound frequency bands can be fought by means of different devices respectively adapted to the frequencies.

Advantageously, for cushioning oscillations and for insulating against body sound, the drive is mounted in a manner known per se by means of resilient and cushioning rubber bushings which, however, are so designed that no metallic connection or any connection which is a good sound conductor will exist between the drive and the helicopter cell.

This connection, however, is the sole connection to the cell whereas with heretofore known helicopters the body sound is conveyed by a drive shaft into the drive housing and thereby into the cell, which means that a metallic connection exists. Since such a connection is not present in the arrangement according to the invention, the resilient and cushioning rubber bushings may be so designed that the body sound will almost be completely muffled.

The rear portion of the driving plant compartment may, for purposes of muffling the low-frequency sound energy, be lined with an insulating medium as, for instance, glass wool.

The arrangement according to the present invention preferably comprises an air inlet at the rear portion of the drive plant chamber or compartment and also comprises an arrangement of devices known per se for feeding secondary air to the exhaust gas jet in order at least partially to intermix the hot exhaust gases with the air within the paneling of the helicopter.

Preferably, in the front portion of the drive plant chamber there is floatingly suspended a curved sound reflector which may extend over a quarter of a circle.

The sound reflector may consist of a core of closed hard foam cells which core is covered by a synthetic skin, for instance, a thermoplastic resin, onto which a thin hard steel metal sheet is cemented.

If desired, between the drive plant chamber located on the cabin rear wall and the cabin rear wall there may be provided a sound muffling spar element or panel of foam material and synthetic glass fibers while on that side of the spar element or panel which faces the drive plant chamber side there may be provided cones of synthetic material with closed cells.

The upper wall of the drive plant chamber may be provided with a sound muffling material as, for instance, foam material.

The upper wall of the front part of the drive plant chamber may be provided with louverlike openings for feeding air and withdrawing sound.

Referring now to the drawing in detail, the chamber housing the drive or turbine plant is by means of a partition 19 subdivided into a rear portion 15 and a front portion 16. The rear portion 15 houses the turbine 20 with the exhaust section 5, whereas the front portion 16 houses the work compressor 21, the gas generator compressor 25 and the inlets 24 of the turbine drive 1. The turbine drive 1 is by means of resilient and muffling rubber bushings 2 arranged in a supporting frame 22 of the helicopter. The rear portion 15 is lined with an insulating material 3 and has an air inlet 4. As insulating material 3 there may be used glass wool.

The exhaust section 5 is equipped with standard means for feeding secondary air to the exhaust jet.

Floatingly suspended in the front portion 16 of the drive chamber is a sound reflector 10 which comprises a core 12 of closed hard foam cells. This core 12 is covered by a skin 13 of synthetic material as, for instance, epoxy reinforced fiber glass. A thin hard steel sheet metal layer of foil 14 is cemented to the skin 13. A sound-muffling spar element 7 having that side thereof which faces the drive chamber provided with cones 8 of synthetic material is located between the rear wall 17 of the cabin and the drive chamber connected thereto. The upper wall 18 is provided with a sound muffling material 6, such as moltopren, whereas the front portion 16 is provided with louver-shaped openings.

OPERATION

In view of the above referred to arrangement of the drives and the subdivision of the drive chamber into two areas 15 and 16 respectively screened relative to each other, it is possible to divide the sound of the drive primarily into two areas 15 and 16 respectively screened relative to each other. It is possible to divide the sound of the drive primarily into the two sound frequency bands of approximately 20 —6,000 hertz (part 15) and approximately 6,000—18,000 hertz (part 16).

The low-frequency sound energy of a frequency of from 20 to 6,000 hertz which is produced on the combustion chamber side of the turbine drive is, by means of the insulating medium 3 lining the rear portion 15 of the drive chamber and due to the intermixing of cold air with the exhaust gas jet, muffled within the paneling.

The high-frequency sound energy which is produced in the front portion 16 of the drive chamber by the compressor of the turbine drive and which has primarily frequencies of from 6,000 to 18,000 Hertz hits in the form of a sharply bundled sound cone 9 upon the reflector 10 which reflects said sound cone 9 in the direction of the louver-shaped openings 11. The sound energy which is not caught in view of the coincidence effect is reduced by means of the sound muffling spar 7 and by the cones 8 of synthetic material. The intermediate layer 6 of foam material in the upper wall of the drive chamber serves the same purpose.

Sound oscillations of the turbine drive are, at the transit to the passenger cabin, fought by resilient and muffling rubber bushings 2 so that any sound conducting connection to the cell will be avoided.

The sound reflector 10 is furthermore intended to guide the air to the compressor inlet which air enters through the louver-shaped openings 11 in the upper wall 18 of the front portion 16 of the drive chamber. Impurifications which due to the centrifugal force occurring during the deviation of the air collect on the sound reflector 10, especially rain and condensing water, collect at the bottom 23 of the front portion 16 of the drive chamber which bottom is easily accessible for cleaning.

Numerous measuring tests have shown that the sound cone 9 emanating in forward direction from the drive has an opening angle of approximately 42°. The sound intensity in the cabin can in this way be reduced to less than 60 percent of the value occurring at the drive.

In view of the fact that the drive is journaled in resilient and muffling rubber bushings, there is obtained an insulation against vibration of 98percent and a level reduction of the body sound by 34 db as determined by corresponding tests.

It is, of course, to be understood that the present invention is, by no means, limited to the showing in the drawing but also comprises any modifications within the scope of the appended claims.

Thus, while the skin 13 may be of any suitable thermosetting plastic, a particularly satisfactory thermosetting plastic in this connection is epoxy reinforced fiber glass.

Also while the conical members 8 may be of various types of synthetic material, particularly suitable in this connection is Lynizell.

What I claim is:

1. In combination in an air vehicle, especially helicopter, having a cabin and a drive plant compartment arranged behind said cabin when looking in forward flight direction of said air vehicle: sound absorbing partition means dividing said compartment into a first section adjacent said cabin and a second section behind said first section when looking from said cabin in the direction toward said first section, at least one turbine drive plant comprising IN substantially axial alignment and in the following sequence one behind the other a work compressor, a gas generator compressor, turbine means, and an exhaust gas outlet, said work compressor and said gas generator compressor being located in said first section, and said turbine means and said exhaust gas outlet being located in said second section, said partition means separating the primarily high-frequency sound of the compressors from the primarily low-frequency sounds of the turbines whereby the strongly bundled and primarily high-frequency sound of said compressors is radiated in forward flight direction of said vehicle, and the primarily low-frequency sound produced by the flow of the exhaust jet into and its intermixture with the surrounding outer air is radiated primarily in the direction away from said cabin.

2. An arrangement according to claim 1, which includes sound reflector means floatingly mounted in said first section between said cabin and said work compressor for deflecting the sound waves received from said compressors away from said cabin.

3. An arrangement according to claim 2, in which said sound reflector means has a concave surface facing the sound exit of said work compressor.

4. An arrangement according to claim 2, in which said sound reflector means comprises a core member of hard foam material with closed cells, a skin of synthetic material covering said core member, and sheet metal means covering said skin.

5. An arrangement according to claim 4, in which said skin is of a thermosetting plastic.

6. An arrangement according to claim 1, which includes sound absorbing spar means arranged between said compartment and the cabin wall adjacent said compartment, and conical members mounted on said spar means and extending into said compartment.

7. An arrangement according to claim 6, in which said spar means comprises foam material and glass fiber material, and in which said conical members are of synthetic material with closed cells.

8. An arrangement according to claim 1, in which the upper wall of said compartment is covered by a sound absorbing material.

9. An arrangement according to claim 1, in which said second section is lined wit insulating material.

!10, An arrangement according to claim 1, in which said second section is lined with glass wool.

11. An arrangement according to claim 1, in which the upper wall of said first section is provided with louver means for admitting air and passing therethrough sound waves emanated from said compressors.

12. An arrangement according to claim 1, in which said second section has an air inlet and means for feeding secondary air to the exhaust gas jet for at least partially intermixing cold air and hot exhaust gases within the air vehicle.

13. An arrangement according to claim 1, which includes metal-free resilient and shock absorbing rubber bushings for journaling said drive plant while preventing any metallic and good sound conducting connection of said drive plant with said cabin.

14. A method of reducing the transmission of sound from the drive plant in an air vehicle, especially helicopter, to the cabin thereof, which includes the steps of; subdividing the drive plant compartment into at least two sound ranges, namely one of a higher frequency and one of a lower frequency, and directing the sound of higher frequency in forward flight direction of the air vehicle while directing the sound of lower frequency in the direction away from said air vehicle cabin.

* * * * *